United States Patent Office 3,141,121
Patented July 14, 1964

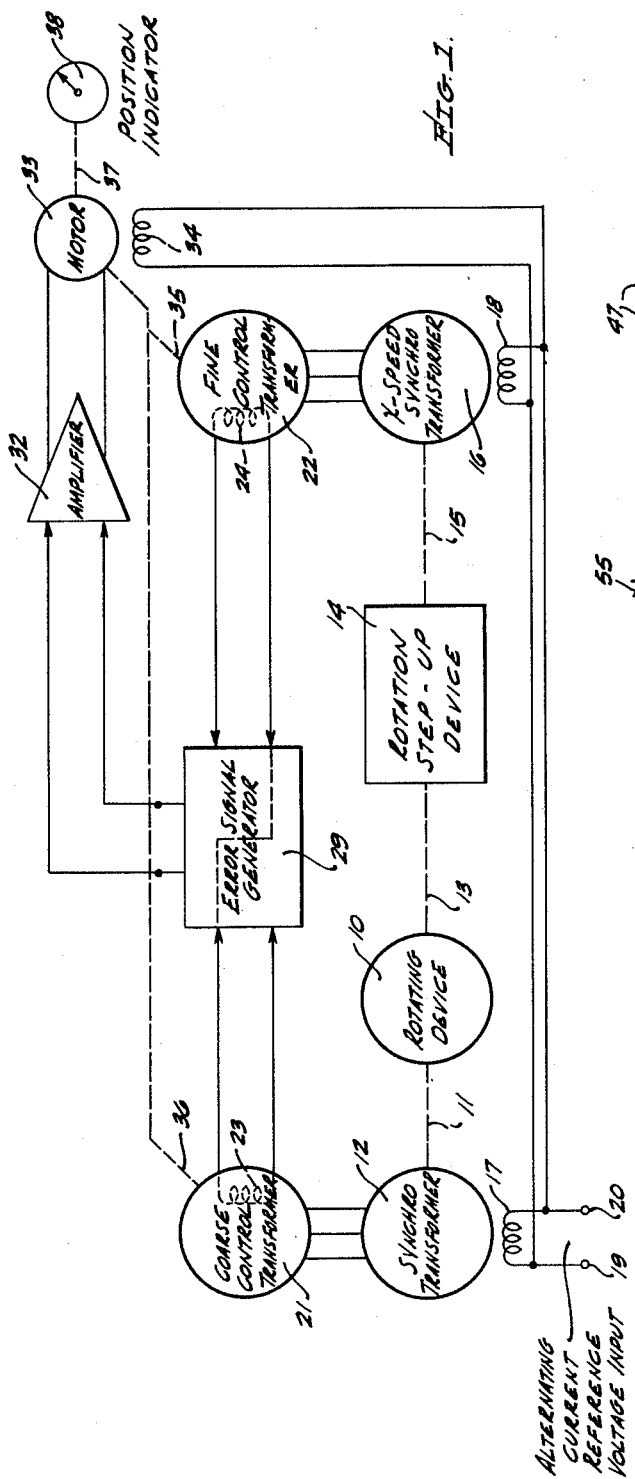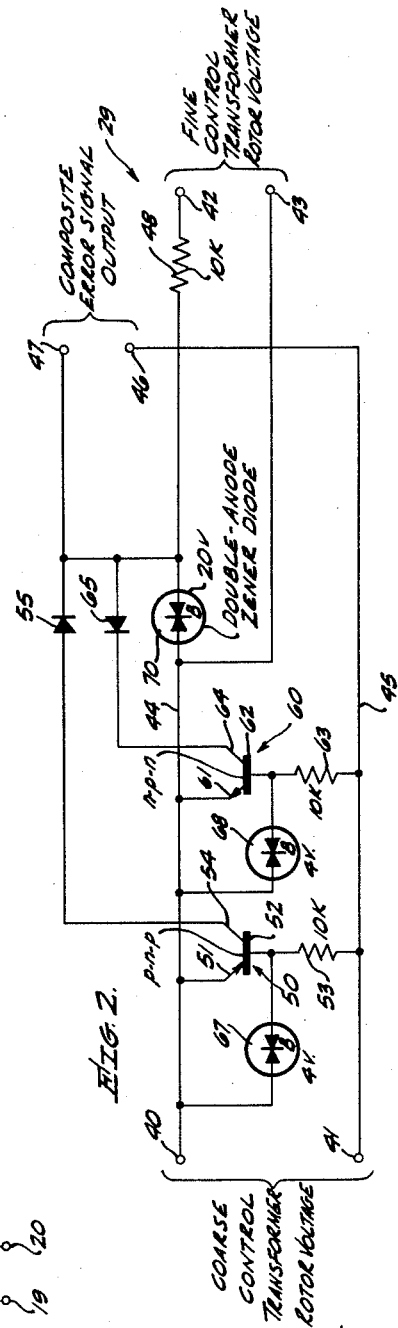

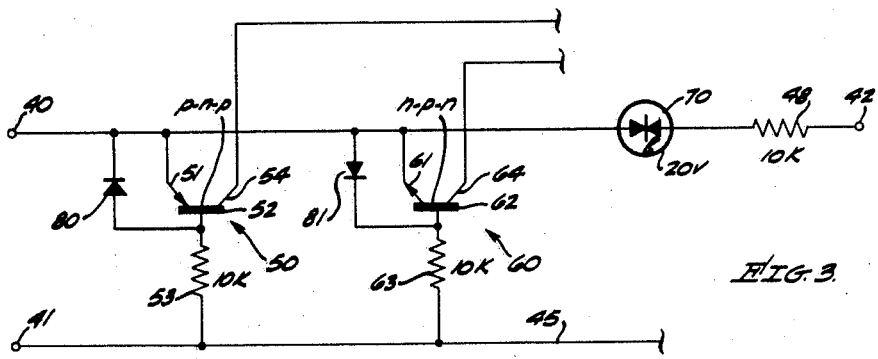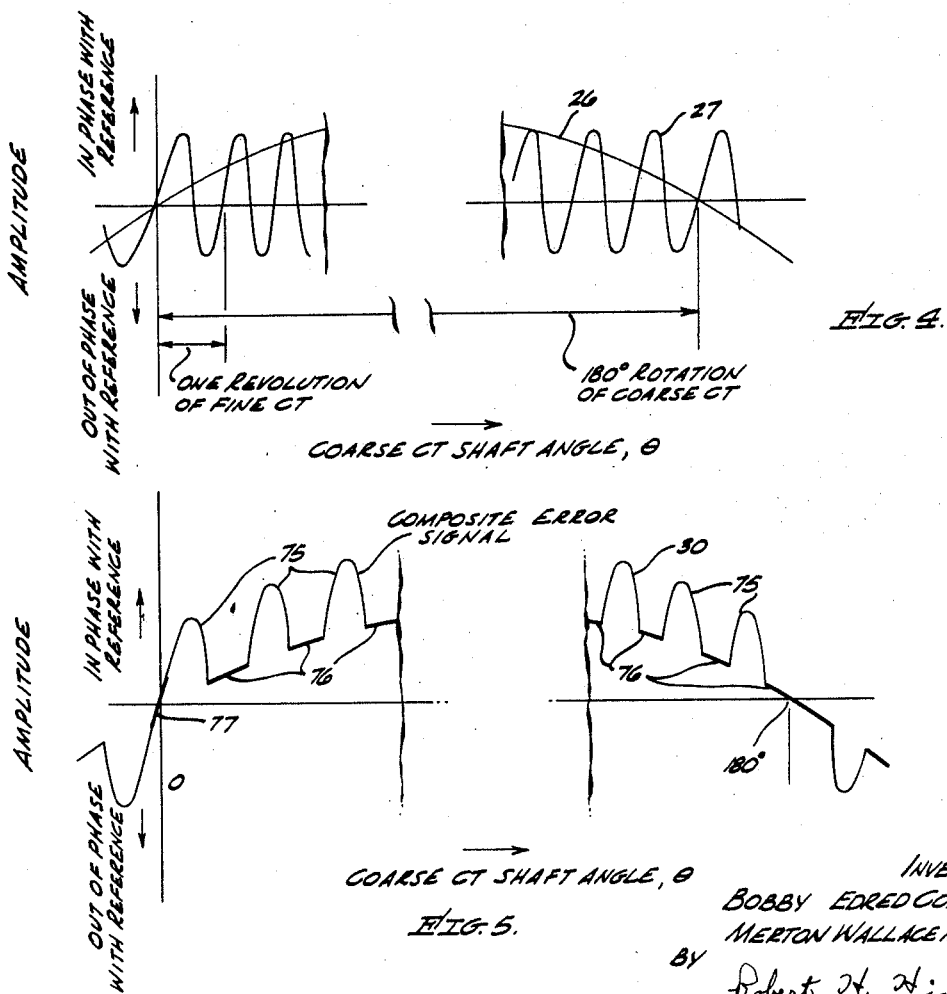

3,141,121
COMPOSITE SIGNAL GENERATING MEANS FOR MULTIPLE-SPEED POSITIONAL SERVO SYSTEM
Merton Wallace Moody, Anaheim, and Bobby Edred Conley, Fullerton, Calif., assignors to Hughes Aircraft Company, Culver City, Calif., a corporation of Delaware
Filed Aug. 30, 1961, Ser. No. 135,410
5 Claims. (Cl. 318—30)

This invention relates to a servo position indicating apparatus and more particularly to a servo position indicating apparatus having a fine and a coarse control transformer and incorporating a device responsive to the outputs therefrom for generating a composite error signal which eliminates "stable" points at erroneous positions.

At the present time it is the practice to achieve additional accuracy by employing a "fine" control transformer which is rotated at speed that is an integral number of times faster than a "coarse" control transformer. In addition, this speed is speed which is selected so that the number of times faster may be divided into 360° an integral number of times. For example, in the case of a "fine" speed that is 36 times the speed of the rotor of a coarse control transformer, each revolution of the fine control transformer represents a 10° rotation of the coarse control transformer. For this reason it is desired to employ ratios of speed that are evenly divisible into 360°. Employment of such ratios, however, introduces a problem in that a stable point is generated at 180° as well as the desired stable point at 0°. In actual practice this would mean that the pointing mechanism of the servo position indicating apparatus could assume a direction that is diametrically opposite from the true position.

One method of overcoming this difficulty in the past has been to employ a "sensing amplifier" which operated in conjunction with a relay to reverse the phase of the field excitation on the servo transformer when nulling on an erroneous stable point. Still another method in which this difficulty was overcome was to shift the level at which the phase of the signal generated by the coarse control transformer coincided with that of the fine control transformer by means of a "stick off" voltage so that an odd number of "alternations" of phase coincidence of the fine control transformer signal appeared between the zero or phase change points of the coarse control transformer signal. In addition, the fine control transformer signal was limited so that the composite signal changed phase with a positive slope only once during each cycle of the coarse control transformer signal thereby generating only one stable point at the 0° point of the cycle. The difficulty with these prior art methods of eliminating erroneous stable points is that the apparatus is both complex and requires levels of voltages and currents which are extremely critical.

It is therefore an object of the present invention to provide an improved servo position indicating apparatus.

Another object of the present invention is to provide a dual-speed servo position indicating apparatus incorporating a composite error signal generator having only one stable point.

Still another object of the present invention is to provide a dual-speed servo position indicating apparatus incorporating a network for combining rotor voltages of fine and coarse control transformer in a manner whereby the resulting composite error signal has only one stable point.

In servo position indicating systems, it is general practice to develop one or more control voltages by means of control transformers. These control voltages are either in phase or out of phase with a reference signal and as such are employed either directly or indirectly to effect the rotation of a motor towards a stable point sometimes referred to as a zero or null point. In accordance with the present invention, an apparatus is provided for combining control signals available at the rotors of coarse and fine control transformers of the disclosed system whereby during intervals when the coarse and fine control signals are of the same phase an error signal is generated that has a root-mean-square magnitude equal to the coarse plus the fine control signals. Further, during intervals when the fine control signal is of a phase that is opposite from that of the coarse control signal, the coarse control signal becomes the error signal. When combined in this manner, the error signal thus changes phase with respect to the reference signal in a manner generated to create a stable point at 0° and an unstable point at 180°. An unstable point is an angle where the error signal has zero amplitude and the motor rotates away therefrom. Also, there are no other points between 0° and ±180° where the composite error signal changes phase with respect to the reference signal and thus creates erroneous stable points.

The above-mentioned and other features and objects of this invention and the manner of obtaining them will become more apparent by reference to the following description taken in conjunction with the accompanying drawings, wherein:

FIGURE 1 illustrates a schematic block diagram of a servo position indicating apparatus in accordance with the present invention;

FIG. 2 shows a schematic circuit diagram of the composite error signal generator of the apparatus of FIG. 1;

FIG. 3 shows the schematic circuit diagram of the composite error signal generator of FIG. 2 with an alternative means of protecting the transistors from over-voltages;

FIG. 4 illustrates output voltage envelopes from the rotor of the coarse and fine control transformer of the apparatus of FIG. 1; and FIG. 5 shows the envelope and phase relative to a reference signal of the composite error signal generated by the composite error signal generator of FIG. 2 in response to the output signals from the coarse and fine control transformers of FIG. 1.

Referring now to FIG. 1 of the drawings, there is shown a schematic block diagram of the position indicating apparatus of the present invention. In particular, a rotating device 10, the position of which is to be indicated, is coupled through a mechanical linkage 11 to a synchro-transformer 12. In addition, the rotating device 10 is coupled through a mechanical linkage 13 to a rotation step-up device 14 which may, for example, constitute a gear box. The rotation step-up device 14 is, in turn, coupled through a mechanical linkage 15 to an X-speed synchro-transformer 16 wherein X is the number of revolutions the X-speed synchro-transformer 16 is turned by the rotation step-up device 14 for each revolution of the rotating device 10. In general, X is an integral number that is evenly divisible into 360° such as, for example, 24 or 36. The synchro-transformer 12 and the X-speed synchro-transformer 16 have excitation windings 17 and 18, respectively, which are connected across reference voltage input terminals 19 and 20. The reference voltage applied to the terminals 19, 20, may, for example, have a frequency of 60, 400 or 4000 cycles per second.

The synchro-transformer 12 and the X-speed synchro-transformer 16 each have three output leads which are connected, respectively, to a coarse control transformer 21 and to a fine control transformer 22. The coarse and the fine control transformers 21, 22 have output rotor windings 23, 24, respectively, which generate sine wave signals which are either in phase or out of phase with the reference signal applied across terminals 19, 20.

In addition, the root-mean-square magnitude of the control signals developed by rotor windings 23, 24 vary in a sinusoidal manner for increasing angular deviation from the angle corresponding to that of the rotating device 10 as illustrated by envelopes 26, 27, FIG. 4, wherein a positive ordinate indicates that the signal is in phase with the reference signal, i.e., of the same polarity, and a negative ordinate indicates that the signal is of opposite phase or polarity from the reference signal. In particular, the envelope 26 of the output voltage developed by rotor winding 23 of the coarse control transformer 21 undergoes one complete period or cycle for each revolution of the synchro-transformer 12 and the envelope 27 of the output voltage developed by rotor winding 24 of the fine control transformer 22 has X complete periods for each period of envelope 26 and, hence, for each revolution of the rotating device 10. Also, the relative positions of the synchro-transformer 12 and the X-speed synchro-transformer 16 are adjusted so that an even number of periods of the envelope 27 of the control signal developed by the fine control transformer 22 appears between each one-half period of the envelope 26 of the control signal developed by coarse control transformer 21.

The output rotor windings 23, 24 of the coarse and fine control transformers 21, 22, respectively, are connected to respective inputs of an error signal generator 29. The error signal generator 29 develops a composite error signal having a root-mean-square magnitude and phase relative to the reference signal as illustrated by envelope 30, FIG. 5. This composite error signal represented by envelope 30 constitutes the sum of the control signals developed by rotor windings 23, 24 when the control voltages therefrom are of the same phase and only the control signal developed by the rotor winding 23 of coarse control transformer 21 when the control voltages from the rotor windings 23, 24 are of opposite phase or polarity. The composite error signal of a magnitude and phase or polarity represented by envelope 30 and generated by the error signal generator 29 is applied to an amplifier 32 and used to provide driving current for a motor 33. The motor 33, in addition, has a winding 34 which is connected across the terminals 19, 20 thereby to be energized by the alternating-current reference voltage. The motor 33 is, in turn, mechanically coupled through mechanical linkages 35 and 36 to the fine and coarse control transformers 22, 21, respectively, and, in addition, is mechanically coupled over a mechanical linkage 37 to a position indicator 38. The polarity of the driving current applied to motor 33 is adapted to rotate the rotor of the coarse and fine control transformers 21, 22 to a stable point where there is zero voltage output and, hence, reduce the driving current to zero. In particular, when the error signal is in phase with the reference signal applied to terminals 19, 20, the motor 33 rotates in one direction (to the left as shown in the drawing) to reduce the error signal to zero amplitude and when the error signal is of a phase opposite from that of the reference signal, the motor rotates in an opposite direction to reduce the error signal to zero amplitude. The angle or point corresponding to this zero amplitude is a stable point in that the motor 33 will always rotate towards this point. At the stable point, the angular position of the rotor of motor 33 is indicative of the angular position of the rotating device 10. The motor 33 is also coupled to the indicating hand of the position indicator 38 whereby the hand of position indicator 38 is positioned along with the rotors 23, 24 of the coarse and fine control transformers 21, 22 and, accordingly, is indicative of the angular position of the rotating device 10.

Referring to FIG. 2, there is shown an embodiment of the error signal generator 29 in accordance with the present invention. In particular, the error signal generator 29 includes input teminals 40, 41 which are connected across the output rotor winding 23 of coarse control transformer 21 and input terminals 42, 43 which are connected across the output rotor winding 24 of fine control transformer 22. The terminals 40, 43 are connected together over a lead 44 thereby connecting the rotor windings 23, 24 in a manner such that the total voltage appearing across terminals 41, 42 represents the sum of the voltages developed across the output rotor windings 23, 24 of the coarse and fine control transformers 21, 22, respectively. Further, error signal generator 29 has output terminals 46, 47, the output terminal 46 being connected over a lead 45 to the input terminal 41, which terminal 41 is responsive to the remaining extremity of the rotor winding 23 of coarse control transformer 21. Also, input terminal 42 responsive to the remaining extremity of the rotor winding 24 of fine control transformer 22 is connected through a current limiting resistor 48 to the output terminal 47. Resistor 48, for example, may have an ohmic value of the order of 10,000 ohms.

In addition to the foregoing, error signal generator 29 includes a p-n-p type transistor 50 having an emitter 51 connected to the input terminal 40, a base 52 connected through a resistor 53 to the lead 45, and a collector 54 connected through a diode 55 to the output terminal 47, the diode 55 being poled to allow current flow towards the output terminal 47. In addition, error signal generator 29 includes an n-p-n type transistor 60 having an emitter 61 connected to the input terminal 40, a base 62 connected through a resistor 63 to the lead 45, and a collector 64 connected through a diode 65 to the output terminal 47, the diode 65 being poled to allow current flow towards the collector 64 of transistor 60. The resistors 53, 63 have ohmic values of the order of 10,000 ohms. Also, the transistors 50, 60 are chosen to have low collector current when biased to the cutoff state, high gain, and low collector-emitter voltage drop when conducting. It is also desirable that the diodes 55, 65 be selected to have extremely high back-resistance and low forward-resistance.

In order to provide protection for the transistors 50, 60, double-anode Zener diodes 67, 68 are connected from the input terminal 40 to the respective bases 52, 62. The double-anode Zener diodes 67, 68 conduct in either direction at approximately 4 volts thereby preventing a voltage build-up in excess of this voltage across the emitter 51, 61 to the bases 52, 62, respectively. Lastly, a double-anode Zener diode 70 is connected from the terminal 40 to the output terminal 47. This Zener diode 70 conducts in either direction at a voltage of the order of 20 volts thereby preventing excessive voltages from being applied across the transistors 50, 60.

Referring to FIG. 3, there is shown the composite error signal generator of FIG. 2 with the exception that diodes 80, 81 are connected from the input terminal 40 to the bases 52, 62, respectively, of transistors 50, 60 in lieu of the double-anode Zener diodes 67, 68. In each case the diodes 80, 81 are poled to prevent voltage build-up across the respective transistor 50 or 60 when non-conducting.

In the operation of the device of the present invention, the output voltage from the rotor winding 23 of coarse control transformer 21 is impressed across input terminals 40, 41 of error signal generator 29. When the rotor winding 23 of coarse control transformer 21 is held in a fixed position concurrently with revolving the rotating device 10, the output signal from rotor winding 23 has a magnitude which follows the voltage envelope 26, FIG. 4, and is either in phase or out of phase with the reference signal as indicated by a plus or minus ordinate, respectively, of envelope 26. During the alternations where the signal voltage from rotor winding 23 has a positive polarity, the p-n-p type transistor 50 is "turned on" whereby current flows from the terminal 40 through transistor 50 and diode 55 provided that the potential of the output terminal 47 is negative relative to the potential of input terminal 40. As previously specified, the output from the rotor winding 24 of fine control transformer 22 is applied across input terminals 42, 43. Thus, because of the connection over lead 44 between input terminals 40, 43, the potential appearing at terminal 42 relative to that at input terminals 41 or 46 constitutes the sum of both signal voltages from rotor windings 23, 24 of coarse and fine control transformers 21, 22, respectively. Similarly, during the alternations where the signal voltage from the rotor winding 23 are of negative polarity, the n-p-n type transistor 60 is "turned on" whereby current flows through transistor 60 and diode 65 towards terminal 40 provided that the potential of the output terminal 47 is positive relative to the potential of input terminal 40. From the foregoing it is apparent that when the potential across input terminals 42, 41 is of greater absolute magnitude and of the same phase as the input signal across terminals 40, 41, no current will flow through the transistors 50 or 60, and the output signal available across output terminals 46, 47 will have an envelope substantially equal to that applied across terminals 41, 42, i.e., the sum of the signal voltages generated by rotor windings 23, 24. This condition exists when the ordinates of envelopes 26, 27 are of the same polarity. This condition exists during the intervals designated as portions 75 of the envelope 30, FIG. 5, of the composite error signal whereby the sum of the output signals from rotor windings 23, 24 appear across the output terminals 46, 47 of the composite error signal generator 29.

On the other hand, when the ordinates of the envelope 27 are of opposite polarity from those of envelope 26, it is apparent that the diodes 55, 65 are no longer biased and current flows through the transistors 50, 60. When this is the case, any difference in potential level existing at input terminal 42 effects a voltage drop across resistor 48 and has no effect on the output signal at output terminal 47. Thus, during intervals when this situation exists, the envelope 30 of the composite error signal coincides with the envelope 26 of the control signal developed by rotor winding 23 of coarse control transformer 21. The portions of envelope 30 corresponding to these intervals are designated by heavy lines 76, FIG. 5. Referring to FIG. 5, it is apparent that a composite error signal is generated at output terminals 46, 47 that is in phase with the reference signal from 0° to 180° of coarse control transformer shaft angle and, accordingly, is employed to rotate motor 33 towards 0°, as shown in the drawing. Alternatively, from −180° to 0° of coarse transformer shaft angle, the composite error signal is of a phase opposite from that of the reference signal and will thus cause the motor 33 to rotate in an opposite direction towards the 0° shaft angle. Also, there can be no stable point created at zero amplitude of the envelope 30 at 180° since the motor 33 in each case rotates away from this point. It is, of course, apparent that the field windings of the motor 33 could be reversed so that the zero amplitude point of envelope 30 occurring at 180° of shaft angle could become a stable point and the 0° point an unstable point. To do this, however, would defeat the purpose of employing the fine control transformer 22 which is responsible for generating the fast increase in error signal amplitude per degree error at zero degree shaft rotation of coarse control transformer 21. This portion of the error signal is designated by heavy line 77 on the envelope 30 of the composite error signal, FIG. 5.

Although the invention has been shown in connection with a certain specific embodiment, it will be readily apparent to those skilled in the art that various changes in form and arrangement of parts may be made to suit requirements without departing from the spirit and scope of the invention.

What is claimed is:

1. A dual-speed apparatus for indicating the angular position of a rotatable device, said apparatus comprising
    (a) means coupled to said rotatable device and including a first output rotor for producing a first output signal of an amplitude and phase relative to a reference signal dependent upon the angular position of said first output rotor relative to that of said rotatable device, said first output signal having a predetermined number of phase changes relative to said reference signal per each revolution of said rotatable device when said first output rotor is maintained in a fixed angular position;
    (b) means coupled to said rotatable device and including a second output rotor for producing a second output signal of an amplitude and phase relative to said reference signal dependent upon the angular position of said second output rotor relative to that of said rotatable device, said second output signal having an even integral number of phase changes relative to said reference signal for each phase change of said first output signal relative to said reference signal when said second output rotor is maintained in a fixed angular position;
    (c) an electrical network including first, second and third input terminals, said first and second input terminals being connected to opposite extremities of said first output rotor and said first and third input terminals being connected to opposite extremities of said second output rotor whereby the total voltage generated across said first and second output rotors appears across said second and third input terminals; first and second output terminals, said first output terminal being connected to said second input terminal; a voltage dropping resistor connected from said third input terminal to said second output terminal; means having a low internal impedance compared to the ohmic value of said voltage dropping resistor for producing a potential substantially equal to the voltage across said first and second input terminals at a first junction in response to a potential of positive polarity appearing at said first input terminal relative to said second input terminal; means having a low internal impedance compared to the ohmic value of said voltage dropping resistor for producing a potential substantially equal to the voltage across said first and second input terminals at a second junction in response to a potential of negative polarity appearing at said first input terminal relative to said second input terminal; and first and second unidirectionally conducting devices connected from said first and second junctions, respectively, to said second output terminal, said first unidirectionally conducting device being poled to allow current flow towards said second output terminal and said second unidirectionally conducting device being poled to allow current flow away from said second output terminal thereby to generate a composite error signal representative of the sum of said first and second output signals during intervals that said first and second output signals are of the same phase and representative of said first output signal only during intervals that said first and second output signals are of opposite phase; and
    (d) means mechanically coupled to said first and second output rotors and responsive to said composite error signal and said reference signal for positioning said first and second output rotors to reduce said error signal to zero amplitude thereby to indicate the angular position of said rotatable device.

2. In a device of the type described, an apparatus for generating a composite error signal in response to first and second output voltages developed by coarse and fine control transformers, respectively, said apparatus comprising first, second and third input terminals, said first and second input terminals being responsive to said first output voltage and said first and third input terminals being responsive to said second output voltage whereby the voltage appearing across said second and third input terminals is representative of the sum of said first and second output voltages; first and second output terminals, said first output terminal being connected to said second input terminal; a first resistor connected from said third input terminal to said second output terminal; a p-n-p type transistor having an emitter, a collector and a base, said emitter being connected to said first input terminal and said collector being connected to a first junction; a second resistor connected from said base of said p-n-p type transistor to said second input terminal; an n-p-n type transistor having an emitter, a collector and a base, said emitter being connected to said first input terminal and said collector being connected to a second junction; a third resistor connected from said base of said n-p-n type transistor to said second terminal; and first and second unidirectionally conducting devices connected from said first and second junctions, respectively, to said second output terminal, said first unidirectionally conducting device being poled to allow current flow towards said second output terminal and said second unidirectionally conducting device being poled to allow current flow away from said second output terminal.

3. The apparatus for generating a composite error signal as defined in claim 2 which additionally includes a first double-anode Zener diode connected from said first input terminal to said base of said p-n-p type transistor, and a second double-anode Zener diode connected from said first input terminal to said base of said n-p-n type transistor thereby to prevent excessive emitter-base potentials thereacross.

4. The apparatus for generating a composite error signal as defined in claim 2 which additionally includes a double-anode Zener diode connected from said first input terminal to said second output terminal thereby to prevent excessive voltages across said p-n-p and n-p-n type transistors.

5. The apparatus for generating a composite error signal as defined in claim 4 which additionally includes a first and second unidirectionally conducting device connected from said first input terminal to said bases of said p-n-p and n-p-n type transistors, respectively, said first unidirectionally conducting device being poled to allow current flow from said base of said p-n-p type transistor to said first input terminal and said second unidirectionally conducting device being poled to allow current flow from said first input terminal to said base of said n-p-n type transistor thereby to prevent excessive emitter-base potentials thereacross.

References Cited in the file of this patent
UNITED STATES PATENTS

| | | |
|---|---|---|
| 2,493,772 | McCoy et al. | Jan. 10, 1950 |
| 2,933,666 | Gordon | Apr. 19, 1960 |
| 2,939,061 | Keenan | May 31, 1960 |

UNITED STATES PATENT OFFICE
CERTIFICATE OF CORRECTION

Patent No. 3,141,121  
July 14, 1964

Merton Wallace Moody et al.

It is hereby certified that error appears in the above numbered patent requiring correction and that the said Letters Patent should read as corrected below.

Column 7, line 15, after "second" insert -- input --; column 8, line 11, for the claim reference numeral "4" read -- 2 --.

Signed and sealed this 24th day of November 1964.

(SEAL)  
Attest:

ERNEST W. SWIDER  
Attesting Officer

EDWARD J. BRENNER  
Commissioner of Patents